Patented June 9, 1931

1,808,853

UNITED STATES PATENT OFFICE

CLARENCE JAMES LIVINGSTONE, OF PITTSBURGH, AND WILLIAM A. GRUSE, OF WILKINSBURG, PENNSYLVANIA, ASSIGNORS TO GULF REFINING COMPANY, OF PITTSBURG, PENNSYLVANIA, A CORPORATION OF TEXAS

LUBRICATING OIL AND PROCESS OF MAKING SAME

No Drawing.     Application filed May 18, 1928. Serial No. 278,908.

This invention relates to improved lubricating oils and processes of making same; and it comprises as an improved lubricating oil for use where extreme variation of viscosity with variation of temperature is undesirable, a petroleum oil bodied up with a thickening agent such as soap sufficiently to give it extra viscosity at ordinary temperatures and subsequently reduced back in viscosity by the addition of a miscible nonviscous or substantially less viscous thinning agent; the petroleum oil and the thickening agent and the thinning agent being so proportioned as to result in a product characterized by lubricating quality not substantially less than that of the contained petroleum oil, and characterized by less change in viscosity with change of temperature than that normal to the contained petroleum oil.

The selection of a lubricant for reducing friction resulting from the relative motion of adjacent parts depends on many considerations, physical and chemical. The main physical considerations are the temperature at which the parts to be lubricated will operate, the unit pressure of the bearing surfaces during operation, and the velocity of relative motion of the bearing surfaces. In an internal combustion engine there are very different conditions existing in different parts of the mechanism. The cylinder walls and sides of the pistons operate at elevated temperatures, the unit pressure with which the adjacent surfaces of these parts bear on one another during a part of the cycle is quite high, and the velocity of relative motion of the bearing surfaces of these parts is always high. The relative velocity of motion of the surfaces of rotating parts in their bearings is ordinarily somewhat lower, the unit pressures upon the bearing surfaces of such adjacent parts are usually moderately high, and the temperatures of such bearings during operation are usually about 200° lower than the piston-cylinder wall temperature. Unfortunately, as between the lubrication conditions of the piston-cylinder wall movement and the lubrication conditions of the revolving parts, each of the factors affecting lubrication of the revolving parts calls for a less viscous lubricant than that required for the piston-cylinder wall lubrication. In no case does a condition at one point tend to offset another condition at another point. The requirements being so different it would be desirable to provide separate systems of lubrication. However, to provide separate systems of lubrication would mean very serious complication of the engine, and it is the almost invariable practice to provide a single lubrication system which comprises between the two very different requirements.

If an internal combustion engine is set up on a foundation to provide motive power for some particular purpose, and is kept running continuously the factors influencing lubrication at any particular point will remain constant, but in the operation of an internal combustion engine as the power unit of an automobile there is not continuous operation under constant conditions. The velocity of motion will vary with the speed with which the car is driven, but the range through which the velocity of movement can be varied in a motor car is not so wide as to effect any decided difference in the lubrication requirements. Of the main factors which influence lubrication, temperature is by far the most important one in practice.

The importance of the temperature of the parts to be lubricated has been pointed out, but within that temperature range which permits the use of oil as a lubricant the temperature of the parts is important only because the temperature of the adjacent metal determines the temperature of the lubricant. While there is a great difference in the temperatures existing at different points of lubrication during the continuous operation of an internal combustion engine operating at a constant velocity under a uniform load, the temperature variations and effects are multiplied when the engine is used in an automobile, with frequent starting from the relatively low temperature of a cold engine.

The importance of the temperature factor in lubrication practice results from the fact that, while next to inherent oiliness the viscosity or body of a lubricant is its most essential characteristic, changes in temperature effect disproportionate changes in this all important quality.

As a specific example of temperature effect on lubrication: suppose that the main bearings operate at a temperature of 150° F. and suppose there is provided an oil which will have a viscosity, Saybolt, of 100 seconds at that temperature. If the engine becomes overheated sufficiently to raise the temperature to 200° F., the viscosity of that oil will have fallen off to 55 seconds, Saybolt. In contrast to this consider the situation when that same engine is started after it has had an opportunity of arriving at the temperature of the surrounding atmosphere. If the temperature is 68° F., the oil under discussion will have a Saybolt viscosity of 905 seconds instead of 100 seconds. If the oil has cooled down to 55° F. it will have acquired a Saybolt viscosity of 1575 seconds.

As previously stated, the almost invariable practice is to provide a single lubrication system for the entire engine, and so use the same oil for lubricating all parts. The temperature of the oil lubricating the movement of the pistons in the cylinders will be somewhere around 350° F. and at such a temperature the oil under discussion will have a viscosity not exceeding 25 or 30 seconds, Saybolt.

A viscosity of 25 or 30 seconds, Saybolt, at the operating temperature is much less than is desirable for the pressure and velocity conditions between the pistons and cylinder walls.

A viscosity at starting of 1000 seconds, 1500 seconds, and much more at lower temperatures, is quite as undesirable as is the great reduction of viscosity at the operating temperature in the cylinders.

After an engine is stopped, it is quite warm and the lubricant, thinned by heat, largely drains away from the parts to be lubricated. Starting with the condition of insufficient lubrication, and starting also with an engine and lubricant which have attained the temperature of the surrounding air, which temperature will have resulted in the lubricant having a viscosity of from 1000 to 2000 seconds, Saybolt, or more, there is little promise of any lubrication for a period of some minutes to those parts which receive their lubrication through oil ducts. The oil pump provided for the purpose of supplying these parts with lubricant is unable to force lubricant of such extreme viscosity through these ducts until they, and the oil within them, are warmed up by the operation of the engine. Not only does the engine start up with little lubricant present at those points which depend on the force feed system, but these points do not get any additional lubrication for some minutes.

So it will be seen that the lubrication system of an automobile, in its attempt to compromise between the requirements of piston-cylinder lubrication and the requirements of the other parts, fails to give anything like the desired lubrication of any part. The oil lubricating the movement of the pistons in the cylinders should have a viscosity at operating temperature two or three times as high as it actually does have, while the oil providing the lubrication for the remaining parts of the engine should, at the starting temperatures, have a viscosity of not more than from one-half to one-third of its actual viscosity. If it were possible to make a lubricating oil having the temperature-viscosity relation which it would be desirable to have, in order to fit in with the practical necessities of engine design, that oil would probably have a viscosity of about 75 seconds at the operating temperature for piston-cylinder lubrication and with a viscosity not greater than 400 to 500 at starting temperatures.

We, however, have found a means for substantially reducing the undesired effect of temperature on the viscosity of a petroleum lubricating oil. This we accomplish by using as principal ingredient a normal petroleum oil which will exhibit the undesirably great change in viscosity with change in temperature as already set forth, and by adding to that oil a small quantity of soap. The addition of the soap effects a very great increase in viscosity and we then reduce this viscosity back by the addition of a non-viscous or less viscous solvent.

In a specific embodiment of this invention, we start with the oil already described. This oil has a viscosity of 330 seconds Saybolt at 100° F. and a viscosity of 50 seconds Saybolt at 210° F. To such an oil we add one-half of one per cent of soap and we thereby obtain an oil with a viscosity of 670 seconds Saybolt at 100° F. and a viscosity of 76 seconds Saybolt at 210° F. We then add 12 per cent of petroleum naphtha to this oil-soap mixture and we thereby obtain a product having a viscosity of 215 seconds Saybolt at 100° F. and a viscosity of 51 seconds Saybolt at 210° F.

The viscosities given are those at the temperatures which it is customary to use in the laboratory, but the viscosities in which we are especially interested are those at temperatures below 100° F. and above 210° F. The interpolation and extrapolation of viscosities of petroleum lubricants at other temperatures, above their pour point, is greatly facilitated by a chart devised by Winslow H. Herschel of the United States National Bureau of Standards and published in "The Oil and Gas Journal" for December 2, 1926, by permission of the Director of the National Bureau of Standards of the United States Department of Commerce. This chart indicates that both the original oil mentioned and this oil as combined with soap and naphtha in the specific embodiment set forth, would have Saybolt viscosities of 45 seconds at a temperature of 232° F., while by viscosimeter measurement at a temperature of 55° F. the original oil has a viscosity of 1575 seconds and the specific embodiment of our invention above set forth has a viscosity of only 801 seconds. At a temperature of 68° F. the improved oil here described has a Saybolt viscosity of 504 seconds, while the original oil has a Saybolt viscosity of 905 seconds. And this effect is not accomplished by mere dilution or by mere addition of soap.

It will be seen by the foregoing that this invention provides a means whereby a petroleum oil having a viscosity of 45 seconds Saybolt at a temperature of 232° F. can be converted with no loss of lubricating qualities to a product having the same viscosity at 232° F., but which will have a viscosity of only 801 seconds at 55° F. instead of a viscosity of 1575 seconds as had the original oil.

The method set out above for producing our product is one of great flexibility, permitting us to use oils of different viscosities and to combine with them various percentages of soap and of solvent to obtain a wide variety of products all characterized by a reduced change in viscosity with change of temperature. By varying the proportion of the several ingredients we find it possible to vary through a wide range the susceptibility of the viscosity of the lubricant to changes of temperature. We are enabled to produce a lubricant having a viscosity equivalent at some temperature to the viscosity of the contained petroleum oil at that temperature, but which has greater fluidity at lower temperatures and less fluidity at higher temperatures than the contained oil. Or we can produce a lubricant which will have a higher or a lower viscosity than that of the contained oil throughout the ordinary temperature range, and which will suffer less change in viscosity with change of temperature than is normal to a straight petroleum oil of equivalent viscosity.

Lubricating oils of comparable viscosity, made from crude petroleums of different bases, will have slightly different rates of change in viscosity with change in temperature. However, conditions of use sometimes dictate the use of a lubricant made from crude oil of one base rather than of another. Our invention is applicable to oils derived from crude petroleum of any known base and the effect is very substantial in comparison with oils of equivalent viscosity produced from crude petroleum of the same base as that of the contained oil.

Our invention is not limited to the use of petroleum naphtha for reducing back the viscosity, but comprehends the use of any non-viscous or substantially less viscous liquid which is miscible with and will be retained by the oil-soap mixture, such as other light petroleum solvents, kerosene, 300 oil, gas oil, benzol, carbon tetrachloride, etc. Or we may combine the soap with a principal ingredient of petroleum oil of relatively high viscosity and reduce back the viscosity of the oil-soap mixture by the use of a secondary petroleum oil of substantially less viscosity.

For some purposes a low flash test of the lubricant would be undesirable and we then use non-flammable materials such as carbon tetrachloride for reducing back the viscosity of the oil-soap mixture. This gives a lubricant having as high a flash test or one even higher than that of the principal oil contained therein. In some cases, where a very low flash test is undesirable, but the high flash test of the oil constituent is unnecessarily high we find it advantageous to reduce the viscosity of the oil-soap mixture by means of kerosene, 300 oil, gas oil, or a secondary lubricating oil of substantially lower viscosity than that of the oil constituent, selecting the viscosity reducing liquid in view of the volatility permissible under the conditions of use.

The introduction of the soap into the oil requires vigorous agitation and to get the desired increase in viscosity the added soap should be accompanied by only a relatively minute quantity of water in the final product. The amount of water occurring in the final product is ordinarily so small as to be difficult of exact determination by the usual methods. For ordinary purposes it is sufficient to rely upon the appearance of the oil, and the amount of water is much less than enough to produce a pronounced cloud in the oil. The state of increased viscosity is produced when the moisture present is below that sufficient to effect a visible diminution of the brightness of the oil. The soap may be first introduced into the oil in commercially dry pulverized form or it may be introduced with an excess of water, and the optimum condition may be arrived at from either of these starting points during the process of agitation by maintenance of a controlled atmosphere. Moderate heating during agitation is helpful.

What we claim is:

1. A liquid lubricant consisting of petroleum oil as its principal constituent, minimal amounts of soap and a miscible thinning agent of lower viscosity than said petroleum oil.

2. A liquid lubricant consisting of petroleum oil as its principal constituent, not more than 0.5 per cent of soap and a miscible thinning agent of lower viscosity than said petroleum oil.

3. A liquid lubricant consisting of petroleum oil as its principal constituent, minimal amounts of soap and a miscible oily thinning a gent selected from a class consisting of petroleum naphtha, kerosene, 300 oil, gas oil, benzol and carbon tetrachloride.

4. A liquid lubricant consisting of petroleum oil as its principal constituent, not more than 0.5 per cent of soap and a miscible oily thinning agent selected from a class consisting of petroleum naphtha, kerosene, 300 oil, gas oil, benzol and carbon tetrachloride.

5. A liquid lubricant consisting of petroleum oil as its principal constituent, minimal amounts of soap and carbon tetrachloride.

6. A liquid lubricant for internal combustion engines consisting of petroleum oil as its principal constituent and containing soap and a miscible oily thinning agent of lower viscosity than said petroleum oil, in such proportions as to produce a composition having, in comparison with the said principal constituent, approximately the same viscosity at maximum operating temperatures but a lower viscosity at minimum operating temperatures of said internal combustion engines.

7. A liquid lubricant for internal combustion engines consisting of petroleum oil as its principal constituent and containing soap and a miscible thinning agent of lower viscosity than said petroleum oil, in such proportions as to produce a composition possessing, in comparison with said principal constituent, a higher viscosity at maximum operating temperatures and a lower viscosity at minimum operating temperatures of said internal combustion engine, the said viscosity becoming equal to that of said principal constituent at intermediate temperatures.

8. A liquid lubricant for internal combustion engines consisting of petroleum oil as its principal constituent and containing soap and a miscible thinning agent of lower viscosity than said petroleum oil, in such proportions as to produce a composition possessing, in comparison with said principal constituent, a lower viscosity throughout the normal operating temperature range of said internal combustion engine but possessing a less rapid change of viscosity with temperature.

In testimony whereof, we have hereunto affixed our signatures at Pittsburgh, Pennsylvania, this 17th day of May, 1928.

C. JAMES LIVINGSTONE.
WILLIAM A. GRUSE.